United States Patent [19]

Bächli

[11] 4,270,524
[45] Jun. 2, 1981

[54] SOLAR COLLECTOR

[76] Inventor: Emil Bächli, Hauptstrasse 156, 5403 Endingen, Switzerland

[21] Appl. No.: 938,710

[22] Filed: Aug. 31, 1978

[30] Foreign Application Priority Data

Sep. 24, 1977 [CH] Switzerland ............. 011694/77

[51] Int. Cl.³ .............................................. F24J 3/02
[52] U.S. Cl. ...................................... 126/443; 126/447; 126/438
[58] Field of Search ............... 126/270, 271, 443, 446, 126/447, 450, 433; 285/DIG. 5, 53, 47

[56] References Cited

U.S. PATENT DOCUMENTS

| 3,916,871 | 11/1975 | Estes ............................ 126/450 |
| 3,984,059 | 10/1976 | Davies ....................... 285/DIG. 5 |
| 4,011,855 | 3/1977 | Eshelman ..................... 126/271 |
| 4,090,493 | 5/1978 | Kneer ............................ 126/270 |
| 4,119,085 | 10/1978 | Knowles ........................ 126/271 |
| 4,122,831 | 10/1978 | Mahdjuri ........................ 126/446 |
| 4,142,510 | 3/1979 | Hare ............................... 126/446 |
| 4,183,351 | 1/1981 | Minotani ........................ 126/443 |

FOREIGN PATENT DOCUMENTS 2838076 12/1979 Fed. Rep. of Germany ........... 126/443
2280036 3/1976 France ...................................... 126/443

Primary Examiner—Samuel Scott
Attorney, Agent, or Firm—Werner W. Kleeman

[57] ABSTRACT

A solar collector composed of at least one transparent, hollow evacuated cover tube having arranged therein at least one absorber, and a reflection layer at least partially covering the inner surface of the cover tube. The absorber extends over part of the inner diameter of the cover tube and has one or more fluid-conducting conduits or lines as well as a holder member supporting such lines or conduits which are provided with a selective layer. The individual cover tubes are arranged at a likewise evacuated collecting line or conduit.

4 Claims, 7 Drawing Figures

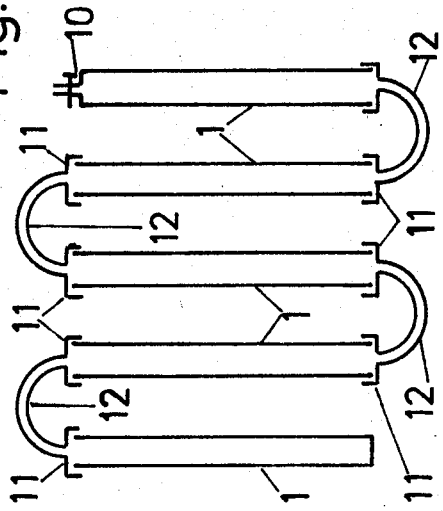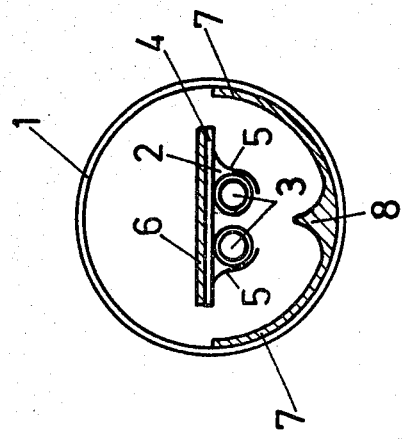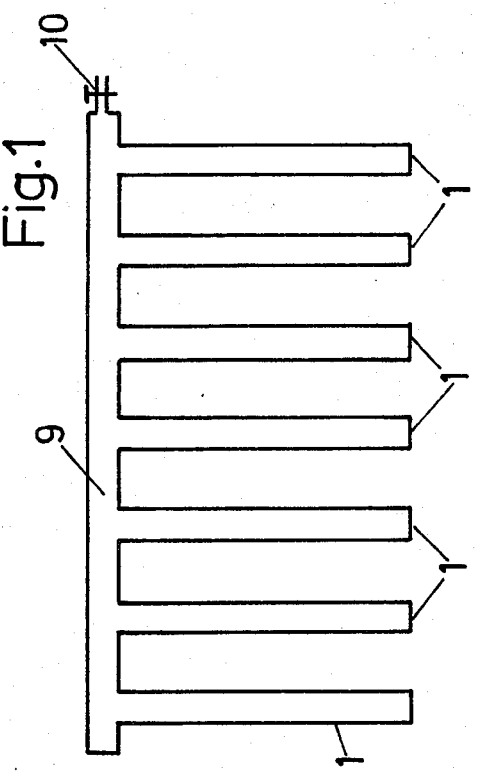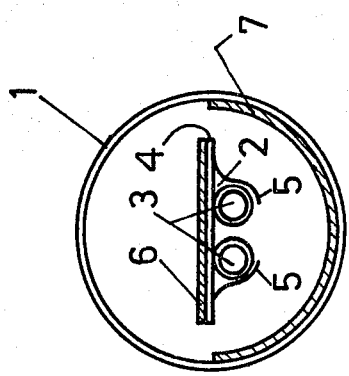

SOLAR COLLECTOR

BACKGROUND OF THE INVENTION

The present invention relates to a new and improved construction of a solar collector composed of a transparent, evacuated cover tube or pipe having arranged therein absorbers and a reflection layer at least partially covering the inner surface of the cover tube.

In order to convert the solar energy into thermal energy, there are employed collectors which directly infeed the energy to a heat storage or the load or consumer. The power capability of the total solar collector installation is predominantly determined by the effectiveness of the solar collectors. During the design of solar collectors the most important criterion is to have as high as possible absorption factor of the absorber and as high as possible transmission factor of the transparent covering. Furthermore, the inherent losses of the collector must be maintained as small as possible and in practice should not exceed values between 50 to 100 $W/m^2$ (watts per square meter).

With the heretofore known solar energy systems there are presently employed predominantly two different basic types of collectors. In particular, firstly the so-called flat plate collectors wherein there is used a glass plate and an energy-absorbing surface arranged therebelow and in spaced relationship from the glass plate; in other words, the energy-absorbing surface is remote from the side of the sun. At the rear face of the absorbing surface, there circulates the heat exchange medium in a gaseous or liquid state. A second known embodiment consists of a double-wall glass tube or pipe collector in which an outer glass tube is connected to and sealed-off in relation to an inner glass tube arranged at a spacing therefrom. The space between both of the glass tubes is evacuated. At least the inner tube has an energy-absorbing layer, and specifically over the surface which is exposed to the action of the sun and in the absorber there is located a heat-absorbing liquid which receives the thermal energy of the sun. A number of such type of tubular-shaped collectors are connected to a collecting line or conduit system through which the liquid is delivered to the tubes and through which, on the other hand, the heat, given off by the absorber, of the liquid contained therein, is delivered to a heat exchanger or load or into a heat storage.

Furthermore, there have been used for quite some time solar collectors having absorbers wherein such absorbers are equipped with a heat-resistant, blackened layer. The inner sides of a hollow cylinder are formed to be light refractive at the side confronting the incidence of the solar energy, so that the major part of the incident solar radiation impinges in a focused manner at the side surfaces of the absorber tube confronting the sun.

Some of the more notable drawbacks of the heretofore known arrangements particularly are in terms of the relatively large constructional expenditure which is required, and, furthermore, the high radiation losses which arise due to the arrangement of a number of transparent tubes. These radiation losses result, for instance, by virtue of the fact that, in the case of glass with perpendicular incidence of the solar radiation approximately four percent of the boundary surface is reflected, i.e., eight percent for each individual pane. With light incidence below 30° in relation to the glass pane, the reflection rapidly assumes higher values. Such type reflection losses can basically be reduced by providing a reflection-reducing coating, but such measures are expensive and complicated.

Apart from the radiation losses there are also to be considered the losses due to heat conduction of the air as the next greatest loss coefficient. For this reason for quite some time it has been proposed to evacuate the intermediate space between the outer cover tube and the absorber.

Yet, there are always present with this proposal problems as concerns the seal between the cover tube and the absorber. By virtue of the different diameters between the cover tube and the diameter of the absorber, there are difficulties which arise owing to the different coefficients of expansion of both tubes.

Hence, with the foregoing in mind it is a primary object of the present invention to provide a new and improved construction of a solar collector which does not exhibit the aforementioned drawbacks, which is simple and inexpensive to fabricate, and which can operate over long periods of time essentially without any need for maintenance.

Still a further significant object of the present invention aims at the provision of a new and improved construction of solar collector which is relatively simple in construction and design, economical to manufacture, and operates at improved efficiencies.

Now in order to implement these and still further objects of the invention, which will become more readily apparent as the description proceeds, the solar collector of the present development is manifested by the features that the absorber extends over a part of the inner diameter of the cover tube and the absorber is provided with liquid-conducting lines as well as a holder plate carrying such lines and which is provided with a selective layer. Further, the individual cover tubes are arranged at a likewise evacuated collector line or conduit.

The advantage of the inventive construction especially resides in the absorber together with the holder or support plate carrying the same. At which holder plate there is applied a selective layer, which can be arranged in an evacuated cover tube or pipe, and the holder plate with the selective layer is completely enclosed by the absorber tube, so that none of the the heat radiation is lost, and thus, there can be obtained low thermal losses and a high thermal capacity.

According to a further advantageous construction of the subject matter of the invention, there are arranged between the individual cover tubes which receive the absorbers double-wall line connections composed of connection tubes and liquid lines or conduits and the intermediate spaces between the liquid lines or conduits and the outer connection tubes are likewise evacuated.

In this way there is realized the advantage that the individual collector tubes can be mutually interconnected in a most simple manner, and both the intermediate spaces between the cover tubes and the actual absorber and the connection tube likewise are evacuated, so that the smallest heat losses prevail in the line connections.

Furthermore, it is advantageous if the evacuated intermediate spaces of the cover tubes are connected with one another by means of the connection tubes.

In this way there is realized the further advantage that there can be undertaken at a single location of an entire solar collector installation possible post-evacuation operations, without each individual collector tube having to be itself evacuated.

According to a further possible construction of the invention the reflection in the cover tube below the absorber possesses a rib-shaped raised portion or protuberance extending over the entire length of the cover tube.

Due to the arrangement of a reflection layer in the cover tube, wherein this layer has a rib-shaped raised portion or arrangement, which is preferably located below the absorber and extends over the entire length of the cover tube, there is also directed the indirect or diffuse radiation of the sun at the underside of the liquid-carrying lines or conduits, so that also with diffuse radiation there is accomplished an appropriate utilization of the energy.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a cross-sectional view through a solar collector constructed according to the teachings of the present invention;

FIG. 1a is a cross-sectional view through a solar collector according to FIG. 1 wherein the reflection layer has a rib-shaped raised portion or arrangement;

FIG. 2 is a parallel circuit of a number of solar collectors;

FIG. 2a shows a number of solar collectors connected in series with one another;

DETAILED DESCRIPTION OF THE PREFERRED EMBODIMENTS

Figure 3A:
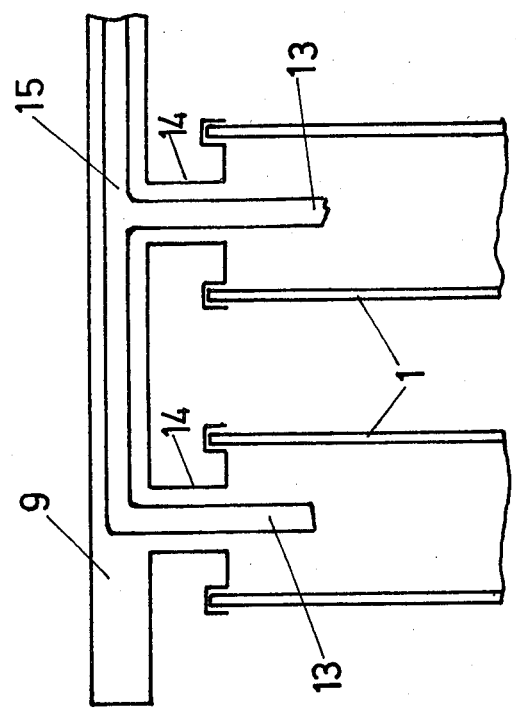
FIG. 3a illustrates a further detail of connection pipes or tubes of individual solar collectors.

Describing now the drawings, it is to be understood first of all that throughout the various embodiments of the different Figures there have generally been used the same reference characters to denote the same or analogous elements. According to the showing of FIG. 1, reference character 1 designates a cover tube or pipe which is formed of any suitable transparent material and the not particularly referenced interior space or compartment of which is extensively evacuated. Internally of the cover tube 1 there is arranged an absorber 2 which extends over the entire length of such cover tube 1. This absorber 2 is formed of at least two liquid-conducting lines or conduits 3 which are attached to a holder or support plate 4 or equivalent structure. The holder or support plate 4 can be advantageously constructed such that it is provided with receiver elements or receivers 5 at its surfaces confronting the liquid-conducting lines or conduits 3 and which receiver elements 5 at least partially surround such lines or conduits 3. The holder plate 4 as well as the receivers 5 are covered by a selective layer or covering 6 which, for instance, can consist of nickel oxide, copper oxide or copper sulfide. At the lower part of the cover tube or pipe 1 there is provided a reflection layer or covering 7 which, for instance, can extend up to the height of the holder plate 4 at the inner circumference of the cover tube 1. By means of this reflection layer 7 the incident solar radiation is likewise reflected from below towards the liquid-conducting lines or conduits 3 and heat these lines up in addition to the direct radiation which impinges at the selective layer 6 of the support or holder plate 4. The reflection layer 7 preferably consists of an infrared-reflecting material, preferably of a layer or covering formed of tin dioxide or indium oxide.

Elements 4 and 6 relate to a holder plate having a selective layer. According to the prevailing knowledge of an average person skilled in this field, the application of a selective layer is generally known. Such type of layer 6 predominantly is applied by vapor deposition of metal or metal alloys. However, it is also possible to apply the layer electrolytically or by rolling on any other metal.

Regarding the material from which there is formed the absorber 6, this absorber tube 6, of course, consists of metal since such material has the best thermal conductivity. It should be evident to a person of ordinary skill in the art that there should be chosen such type metal which has a high coefficient of thermal conductivity such as copper, for instance. This absorber 2 is connected so as to be thermally conductive in a suitable manner with the holder plate 4, for instance, by soldering or brazing. In consideration of the relatively high temperatures which arise within the absorber 2, there is recommended, of course, brazing which utilizes a hard solder.

Figure 4:
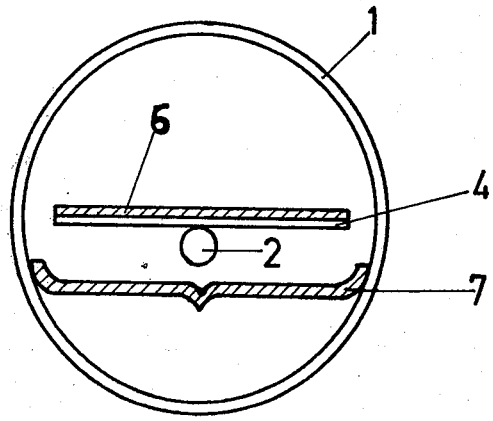
FIG. 4 is a cross-sectional view through a solar collector according to the showing of FIG. 1 having a reflection layer arranged at the largest diameter of the solar collector.

The application of the reflection layer 7 at the cover tube 1 occurs, in a known manner, by adhesive bonding or rolling-on of the layer 7 at the inner surface of the tube 1. The layer 7 can correspond both exactly to the contour of the tube 1 or, as illustrated in FIG. 1a, at the center point can have a raised portion for double reflection of the incident solar radiation or, as shown in FIG. 4, the layer 7 can be arranged in the cover tube 1 below the absorber 2 at a certain spacing therefrom wherein, advantageously, the lengthwise edges are secured at the cover tube 1. The reflection layer 7 has the general purpose of reflecting the incident solar radiation and of focusing such incident solar radiation at the absorber 2 so that, apart from the direct radiation from above, there also can be utilized the indirect radiation impinging from below the absorber 2.

Continuing, a further exemplary embodiment of a solar collector has been shown in FIG. 1a where there is disclosed essentially the same construction as the solar collector of FIG. 1, however with the difference that here the reflection layer 7 comprises a substantially rib-shaped raised portion or protuberance 8 which extends over the entire length of the cover or covering tube 1. This protuberance 8 is advantageously arranged such that the highest point thereof is located exactly between both of the liquid-conducting lines or conduits 3 of the absorber 2. Consequently, there is realized an additional utilization of the diffuse radiation.

The schematic illustration of a number of solar collectors of the type shown in FIG. 1 or FIG. 1a which have been united into the assembly or unit shown in FIG. 2 illustrates that the cover tubes or pipes 1 which are evacuated are connected to a common collecting or collector line or conduit 9 having a valve 10 and with which conduit 9 there is connected a not particularly illustrated but conventional suction pump for evacuation of the cover tubes 1 and the collecting line or conduit 9.

As shown with the modified arrangement in FIG. 2a, the individual solar collectors also can be connected in series behind one another. The individual cover tubes 1 are closed in a most simple manner at both ends by means of the covers or cover members 11 which are sealingly closed by means of standard and thus not particularly shown seals in relation to the cover tubes 1, so that there is maintained in the same manner the vacuum in all of the cover tubes 1. Arranged at the cover members 11 are the connection pipes or conduits 12 by means of which the individual cover tubes 1 are interconnected with one another. Advantageously with this construction the first tube of the solar collector installation is fixedly closed at one end whereas, at the last cover tube, there is again arranged a valve 10 by means of which the entire system can be evacuated.

Figure 3:
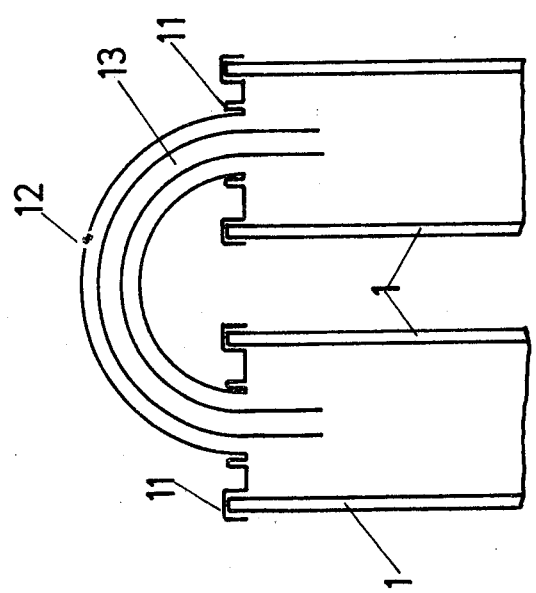
FIG. 3 illustrates a detail of the double-wall line connections or conduits for interconnecting individual solar collectors.

Now in FIG. 3 there is shown in detail the manner in which the individual solar collectors can be connected in series with one another according to the arrangement of FIG. 2a. The cover tubes 1 are sealingly closed by means of the cover members 11 and the connection tubes or pipes 12 mutually interconnect the individual cover tubes 1. At the connection tubes 12 there is present the same vacuum as in the cover tubes 1. Arranged in the connection tubes 12 are the liquid or fluid lines or conduits 13 which are connected with the absorbers 2 which, to simplify the showing of the drawing, have not here been particularly shown, but may be like the absorbers illustrated in detail in FIGS. 1 and 1a.

Now in the series circuit arrangement of FIG. 3a, the cover tubes 1 are again tightly closed by means of the cover members 11, and each cover member 11 has an infeed pipe or conduit 14 which is operatively connected with the collecting line or conduit 9. Consequently, there is likewise insured that in the collecting line 9 there prevails the same negative pressure as in the cover tubes or pipes 1. The individual liquid lines 13 leading from the absorbers 2 likewise open into a collecting pipe or conduit 15 which, in turn, is again connected with a not particularly illustrated load or consumer or heat storage.

FIG. 4 illustrates a further possible construction of a solar collector, wherein in the cover tube or pipe 1 there is arranged the absorber 2 with the holder or support plate 4 and the thereon attached selective layer 6 in the evacuated space of the cover tube 1. Further, below the absorber 2 there is provided a reflection layer 7 such that it covers the entire diameter of the cover tube 1, and thus, advantageously is slightly upwardly bent at the inner walls of the tube 1 so that here also the diffuse radiation is directed towards the absorber 2.

The subject matter of the invention is, of course, not solely limited to the details illustrated in the drawings, and can obviously be expanded as will suggest themselves to those skilled in the art to cover other modifications without departing from the spirit and scope of the underlying principles of the invention. Thus, for instance, instead of having in each case at least two liquid-conducting lines or conduits 3 there could be arranged a line or conduit system composed of a so-called roll bond, i.e., fabricated by a so-called roll-bonding process. With such type construction it is readily possible to apply a selective layer 6 to the roll bond, so that there is no longer needed any special holder or support plate. Furthermore, due to the described construction of inventive solar collector, it is also possible to design practically without limits the length of the transparent cover tube with the therein arranged absorbers, since if, for instance, the cover tubes are supported there is practically eliminated any bending-through thereof. With such type arrangement it also can be particularly advantageous if, in addition to the reflection layer which is applied at the cover tube, the support surface of the individual cover tubes are covered with a reflecting, preferably white color layer, since in this way there can be further utilized any diffusion radiation which possibiy arises between the individual cover tubes.

Furthermore, the possibility exists of arranging externally of the cover tubes 1 a reflecting surface, preferably a mirror surface, such that the cover tube 1 together with the absorber 2 is situated at the focal point, and the absorber 2 can be configured in accordance with the outer mirror surface.

While there are shown and described present preferred embodiments of the invention, it is to be distinctly understood that the invention is not limited thereto, but may be otherwise variously embodied and practiced within the scope of the following claims. Accordingly,

What I claim is:
1. A solar collector comprising:
    a plurality of transparent, hollow cover tubes being arranged substantially parallel to each other and having at least partially evacuated insulating portions;
    at least one absorber arranged substantially centrally within each of said cover tubes and spaced from side walls of each of said cover tubes so that no heat bridges are formed between the absorber and said side walls;
    a reflection layer at least partially covering an inner surface of each of said cover tubes;
    said absorber including:
    at least one liquid-conducting conduit;
    a holder member having a plate means for holding said liquid-conducting conduit;
    a selective layer provided for said holder member; and
    a collecting conduit which has an at least partially evacuated portion that insulates a collecting pipe and which has at least partially evacuated infeed portions that operatively extend from said collecting conduit to each individual cover tube so that the insulating portions of said plurality of cover tubes are continuously interconnected with the insulating portions of said collecting conduit.
2. The solar collector as defined in claim 1, further including:
    a plurality of said cover tubes;
    each individual one of said cover tubes containing at least one of said absorbers;
    a double-wall line connection means for interconnecting the individual ones of said cover tubes;
    said double-wall line connection means comprising connection tubes and liquid lines;
    the connection tubes and liquid lines being arranged so as to define therebetween intermediate spaces which constitute evacuated spaces.
3. The solar collector as defined in claim 2, wherein: said connection tubes interconnect evacuated intermediate spaces of the cover tubes.
4. The solar collector as defined in claim 1, wherein: said reflection layer has a substantially rib-shaped protuberance extending substantially over the entire internal length of each cover tube.

* * * * *